(12) United States Patent
Mun et al.

(10) Patent No.: US 12,305,091 B2
(45) Date of Patent: May 20, 2025

(54) ADHESIVE COMPOSITION FOR LABELS, METHOD FOR PREPARING ADHESIVE COMPOSITION, ADHESIVE SHEET INCLUDING ADHESIVE COMPOSITION, AND ARTICLE INCLUDING ADHESIVE SHEET

(71) Applicant: CJ CHEILJEDANG CORPORATION, Seoul (KR)

(72) Inventors: Bo Ra Mun, Hwaseong-si (KR); Ji Ho Hwang, Seoul (KR); Kyung Su Na, Suwon-si (KR); Sang Gwon Moon, Seoul (KR); Young Lyeol Yang, Seoul (KR); Hyun Joong Kim, Seoul (KR); Jong Ho Back, Ulsan (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 1116 days.

(21) Appl. No.: 17/253,588

(22) PCT Filed: Aug. 30, 2019

(86) PCT No.: PCT/KR2019/011178
§ 371 (c)(1),
(2) Date: Sep. 7, 2021

(87) PCT Pub. No.: WO2020/046056
PCT Pub. Date: Mar. 5, 2020

(65) Prior Publication Data
US 2021/0403766 A1  Dec. 30, 2021

(30) Foreign Application Priority Data
Aug. 31, 2018 (KR) .................. 10-2018-0104012
Aug. 27, 2019 (KR) .................. 10-2019-0105284

(51) Int. Cl.
*C09J 7/38* (2018.01)
*C09J 5/00* (2006.01)
(Continued)

(52) U.S. Cl.
CPC . *C09J 7/38* (2018.01); *C09J 5/00* (2013.01); *C09J 11/06* (2013.01); *C09J 105/08* (2013.01);
(Continued)

(58) Field of Classification Search
CPC ........... C08K 5/175; C08K 5/092; C08L 5/08
See application file for complete search history.

(56) References Cited

U.S. PATENT DOCUMENTS 4,959,412 A  9/1990 Arter et al.
5,026,821 A  6/1991 Boustta et al.
(Continued)

FOREIGN PATENT DOCUMENTS

CN  103599080 A  2/2014
CN  106589475 A  * 4/2017
(Continued)

OTHER PUBLICATIONS

English Abstract of CN 103599080.
(Continued)

*Primary Examiner* — Peter A Salamon
(74) *Attorney, Agent, or Firm* — CANTOR COLBURN LLP

(57) ABSTRACT

Provided is an adhesive composition for labels, including a salt of lysine and citric acid, and chitosan, a method of preparing the adhesive composition, an adhesive sheet including the adhesive composition, and an article including the adhesive sheet.

9 Claims, 1 Drawing Sheet

(51) Int. Cl.
*C09J 11/06* (2006.01)
*C09J 105/08* (2006.01)

(52) U.S. Cl.
CPC .... *C09J 2203/334* (2013.01); *C09J 2301/408* (2020.08); *C09J 2405/00* (2013.01)

(56) References Cited

U.S. PATENT DOCUMENTS

| | | | |
|---|---|---|---|
| 5,284,891 | A | 2/1994 | Wouters et al. |
| 5,330,746 | A * | 7/1994 | Friedman ............ A61K 9/0063 |
| | | | 514/902 |
| 5,932,473 | A | 8/1999 | Swiderek et al. |
| 6,166,102 | A | 12/2000 | Ahn et al. |
| 6,395,198 | B1 | 5/2002 | McArdle |
| 6,475,498 | B1 * | 11/2002 | Rajaiah ............... A61K 6/35 |
| | | | 523/120 |
| 6,486,285 | B2 | 11/2002 | Fujita |
| 6,777,465 | B2 | 8/2004 | Haile |
| 6,881,008 | B1 | 4/2005 | Maile et al. |
| 7,021,864 | B2 | 4/2006 | Maile et al. |
| 7,306,844 | B2 | 12/2007 | Chu et al. |
| 7,398,935 | B2 | 7/2008 | Tran et al. |
| 7,939,145 | B2 | 5/2011 | Dronzek, Jr. |
| 8,519,031 | B2 | 8/2013 | Parker et al. |
| 9,238,761 | B2 | 1/2016 | Omura |
| 9,959,985 | B2 | 5/2018 | Ichinomiya et al. |
| 2002/0022588 | A1 * | 2/2002 | Wilkie ................. A61L 24/10 |
| | | | 424/94.64 |
| 2003/0064178 | A1 | 4/2003 | Smith et al. |
| 2003/0166726 | A1 | 9/2003 | Bechtel et al. |
| 2006/0019234 | A1 | 1/2006 | Shanbrom |
| 2006/0115531 | A1 * | 6/2006 | Chenault ............. A61P 17/02 |
| | | | 424/484 |
| 2007/0128339 | A1 | 6/2007 | Mankovitz |
| 2008/0015386 | A1 | 1/2008 | Murata et al. |
| 2013/0316231 | A1 | 11/2013 | Iijima et al. |
| 2014/0186351 | A1 | 7/2014 | Britta et al. |
| 2014/0323573 | A1 | 10/2014 | Zander |
| 2016/0108138 | A1 * | 4/2016 | Hardy ................. A61K 31/722 |
| | | | 536/20 |
| 2020/0017729 | A1 | 1/2020 | Hwang et al. |
| 2020/0017730 | A1 | 1/2020 | Hwang et al. |
| 2021/0269717 | A1 | 9/2021 | Na et al. |

FOREIGN PATENT DOCUMENTS

| | | | |
|---|---|---|---|
| CN | 106906053 | A | 6/2017 |
| EP | 0196844 | B1 | 9/1992 |
| FR | 1458094 | A | 3/1966 |
| IT | 1177563 | B | 8/1987 |
| JP | 2003160693 | A | 6/2003 |
| JP | 2011099099 | A | 5/2011 |
| JP | 2014074092 | A | 4/2014 |
| JP | 2014105331 | A | 6/2014 |
| JP | 5959867 | B2 | 8/2016 |
| KR | 1020070104446 | A | 10/2007 |
| KR | 100989942 | A | 10/2010 |
| KR | 1020100137146 | A | 12/2010 |
| KR | 1020130046842 | A | 5/2013 |
| KR | 1020160095132 | A | 8/2016 |
| RU | 2110549 | C1 | 5/1998 |
| RU | 2558365 | C2 | 3/2010 |
| RU | 2015155299 | A | 5/2014 |
| WO | 1997019141 | A1 | 5/1997 |
| WO | 2006001345 | A1 | 1/2006 |
| WO | 2006012615 | A2 | 2/2006 |
| WO | 2007092772 | A2 | 8/2007 |
| WO | 2007120653 | A1 | 10/2007 |
| WO | 2010071298 | A2 | 6/2010 |
| WO | 2011136568 | A2 | 11/2011 |
| WO | 2015086545 | A1 | 6/2015 |
| WO | 2015177114 | A1 | 11/2015 |
| WO | 2015184490 | A1 | 12/2015 |
| WO | 2018174570 | A1 | 9/2018 |
| WO | 2020046059 | A2 | 3/2020 |

OTHER PUBLICATIONS

English Abstract of CN 106906053.
Extended European Search Report dated Feb. 2, 2022, issued in EP Patent Application No. 19855147.5, 80 pp.
English Language Translation of Office Action issued May 18, 2022, in corresponding CN Patent Application No. 201980040346. 5, 8 pp.
Office Action issued May 18, 2022, in corresponding CN Patent Application No. 201980040346.5, 5 pp.
English Abstract of RU 2110549.
English Translation of Office Action issued May 19, 2021 in corresponding RU Patent Application No. 2020142628, 6 pp.
English Translation of Search Report dated Aug. 30, 2019, issued in RU 2020142628/04, 2 pp.
Office Action issued May 19, 2021 in corresponding RU Patent Application No. 2020142628, 7 pp.
Search Report dated Aug. 30, 2019, issued in RU 2020142628/04, 2 pp.
English Abstract of KR 10-2013-0046842.
English Translation of Office Action dated Dec. 13, 2020 of the Korean Patent Application No. 10-2019-0105284, which corresponds to the above-identified application.
Office Action dated Dec. 13, 2020 of the Korean Patent Application No. 10-2019-0105284, which corresponds to the above-identified application.
English Abstact of JP 10-2013-0046842.
English Abstract of CA 1278132 (corresponds to EP 0196844).
English Abstract of JP 2003-160693.
English Abstract of JP 2011-099099.
English Abstract of JP 2013-032482 (for JP 5959867).
English Abstract of JP 2014-074092.
English Abstract of KR 10-2007-0104446.
English Abstract of KR 10-2010-0137146.
English Translation of International Search Report issued in PCT/KR2019/011178, dated Dec. 2, 2019, 2 pp.

* cited by examiner

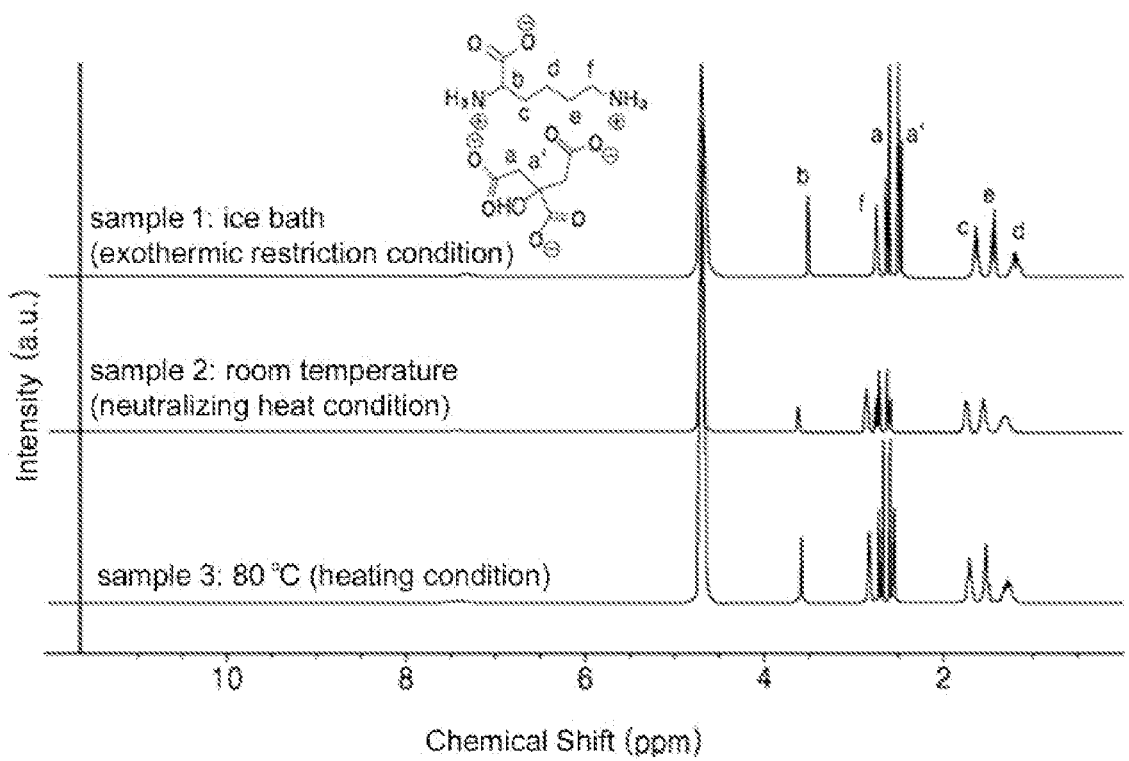

ADHESIVE COMPOSITION FOR LABELS, METHOD FOR PREPARING ADHESIVE COMPOSITION, ADHESIVE SHEET INCLUDING ADHESIVE COMPOSITION, AND ARTICLE INCLUDING ADHESIVE SHEET

This application is a national stage application of PCT/KR2019/011178, filed Aug. 30, 2019, which claims priority to Korean Patent Application No. 10-2018-0104012 filed on Aug. 31, 2018 and Korean Patent Application No. 10-2019-0105284 filed on Aug. 27, 2019, both of which are hereby incorporated by reference in their entirety.

TECHNICAL FIELD

One or more embodiments relate to an adhesive composition for labels, a meth of preparing the adhesive composition, an adhesive sheet including the adhesive composition, and an article including the adhesive sheet.

BACKGROUND ART

In general, an adhesive includes a polymer as a main component to impart adhesion. The adhesive including a polymer as a main component provides excellent adhesion required for various environments by adjusting the structure and molecular weight of a polymer.

However, since a polymer is prepared through complicated processes such as synthesis and purification, various environmental pollutions are caused. For example, a monomer derived from a fossil raw material is used as a raw material for the polymer, an excessive amount of an organic solvent is used in the purification process of the polymer, and a long period of time is required for the decomposition of the prepared polymer.

Therefore, there is a demand for an adhesive which uses a renewable raw material and provides excellent adhesion without using a polymer as a main component.

DESCRIPTION OF EMBODIMENTS

Technical Problem

An aspect provides an adhesive composition for labels, having excellent adhesion and controlled water removability.

Another aspect provides a method of preparing an adhesive composition for labels.

Another aspect provides an adhesive sheet including the adhesive composition for labels.

Another aspect provides an article including the adhesive sheet. Additional aspects will be set forth in part in the description which follows and, in part, will be apparent from the description, or may be learned by practice of the presented embodiments of the disclosure

Solution to Problem

According to an aspect, an adhesive composition for labels includes: a salt of lysine and citric acid; and chitosan.

According to another aspect, a method of preparing an adhesive composition includes: mixing lysine, citric acid, chitosan, and water; and stirring the mixture at 80° C. or lower.

According to another aspect, an adhesive sheet includes: a first substrate; and an adhesive layer disposed on one surface of the first substrate, wherein the adhesive layer includes the adhesive composition for labels.

According to another aspect, an article includes: a second substrate; and the adhesive sheet disposed on one surface of the second substrate.

Advantageous Effects of Disclosure

The adhesive composition for labels according to an embodiment has a new composition including a water-soluble low molecular weight material as a main component, thereby providing both excellent adhesion and controlled water removability.

BRIEF DESCRIPTION OF DRAWINGS

The above and other aspects, features, and advantages of certain embodiments of the disclosure will be more apparent from the following description taken in conjunction with the accompanying drawing, in which: FIG. 1 is a graph illustrating $^1H$ nuclear magnetic resonance (NMR) analysis results, according to Reference Example 7.

BEST MODE

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Hereinafter, an adhesive composition for labels according to an embodiment, a method of preparing the adhesive composition, an adhesive sheet including the adhesive composition, and an article including the adhesive sheet will be described in detail.

Throughout the specification, the term "adhesion" refers to a phenomenon in which two objects (except for gases) are close to or in contact with each other, and then they pull each other. That is, the "adhesion" refers to a phenomenon in which two objects (except for gases) are close to or in contact with each other, and then any force (or work) is required to separate the objects from each other.

Throughout the specification, the term "viscoelasticity" refers to a phenomenon in which a flow having no restoring force to deformation and elastic deformation having a restoring force simultaneously occur when a force is applied to an object. The material having viscoelasticity has both solid and liquid properties.

Throughout the specification, the term "viscosity" refers to a property of disturbing the flow of a material, which is caused by internal friction between molecules. Friction is a force preventing a difference in distribution of flow rate. Adhesion and viscosity are distinct properties. A material having high viscosity may hardly have adhesion, and material having low viscosity may have high adhesion.

A composition having adhesion may have viscoelasticity. A composition having viscoelasticity is required to be deformed by a predetermined force when the composition is applied onto a substrate and then separated from the substrate. The composition having viscoelasticity is capable of reversible attachment to and detachment from a substrate. When the composition having viscoelasticity is applied onto a substrate and dried, an adhesive layer including the composition having viscoelasticity is formed on the substrate. The composition having viscoelasticity is stored and circulated through a general processing form before application to a substrate, and its stickiness is maintained even after a certain period of time has elapsed. Example of the article obtained by applying such an adhesive composition onto a substrate and drying the composition include a label, an oriented polypropylene (OPP) tape, and the like. Further, the composition having adhesion may not have viscoelasticity. A composition having viscoelasticity may be solidified after a predetermined period of time is lapsed since having been applied to a substrate, and an irreversible physical destruction phenomenon may occur when such a solidified material is to be separated from the substrate.

An adhesive composition for labels includes a salt of lysine and citric acid, and chitosan.

The salt of lysine and citric acid is a low molecular weight material, but provide adhesion. The chitosan additionally provides adhesion. Further, the chitosan controls the solubility of the adhesive composition for labels in water. Accordingly, the adhesive composition for labels includes the salt of lysine and citric acid, and the chitosan, thereby providing both excellent adhesion and controlled water removability. The adhesive composition for labels includes the salt of lysine and citric acid as a main component. Throughout the specification, the term "main component" refers to a component having the highest content among components excluding a solvent. In the adhesive composition for labels, it is possible to control the rate at which the salt of lysine and citric acid is removed from the substrate or adherend depending on the content of chitosan. For example, the adhesive composition for labels, applied onto the substrate or adhered, is dissociated through a stirring process and/or a washing process using water of room temperature (25° C.) within 1 minute to 12 hours, 5 minutes to 6 hours, or 10 minutes to 2 hours. However, the dissociation time of the composition is not limited to this range, and is adjusted according to required conditions. The adhesive composition for labels is easily dissociated by water, and the dissociated components are environmentally friendly because they are harmless to living organisms and environments. Since the adhesive composition for labels includes chitosan, the adhesive layer formed of the composition may be removed from the substrate or adherend by water. The deacetylation rate of chitosan is, for example, 70% or more, 75% or more, 80% or more, 85% or more, 90% or more, or 95% or more. The deacetylation rate of chitosan may be evaluated by, for example, a proton NMR method disclosed in Korean Patent Application Publication No. 2010-0137146. The deacetylation rate of chitosan is 70% or more, thereby improving water solubility.

In the adhesive composition for labels, the content of chitosan in the composition is, for example, 8 parts by weight or less, 7 parts by weight or less, or 5 parts by weight or less, based on 100 parts by weight of the composition. When the content of chitosan exceeds 8 parts by weight, precipitation may occur. In the adhesive composition for labels, the content of chitosan in the composition is, for example, 1 part by weight to 8 parts by weight, 1 part by weight to 7 parts by weight, or 1 part by weight to 5 parts by weight, based on 100 parts by weight of the composition.

In the adhesive composition for labels, the content of the salt of lysine and citric acid in the composition is, for example, 70 parts by weight or less, 60 parts by weight or less, or 50 parts by weight, based on 100 parts by weight of the composition. In the adhesive composition for labels, the content of the salt of lysine and citric acid in the composition is, for example, 1 part by weight to 70 parts by weight, 5 parts by weight to 70 parts by weight, 10 parts by weight to 70 parts by weight, 10 part by weight to 60 parts by weight, 10 part by weight to 50 parts by weight, 20 parts by weight to 50 parts by weight, or 30 part by weight to 50 parts by weight, based on 100 parts by weight of the composition. In the adhesive composition for labels, the content of the salt of lysine and citric acid in the composition is, for example, 1 wt % to 70 wt %, 5 wt % to 70 wt %, 10 wt % to 70 wt %, 10 wt % to 60 wt %, 10 wt % to 50 wt %, 20 wt % to 50 wt %, or 30 wt % to 50 wt %, based on a total weight of the composition.

In the adhesive composition for labels, the content of the salt of lysine and citric acid in the composition is, for example, 10 wt % or more, 20 wt % or more, 30 wt % or more, 40 wt % or more, 50 wt % or more, 60 wt % or more, 70 wt % or more, 80 wt % or more, or 90 wt % or more, based on a total weight of organic solids. In the adhesive composition for labels, the content of the salt of lysine and citric acid in the composition is, for example, 10 wt % to 99 wt %, 20 wt % to 99 wt %, 30 wt % to 99 wt %, 40 wt % to 99 wt %, 50 wt % to 99 wt %, 60 wt % to 99 wt %, 70 wt % to 99 wt %, 80 wt % to 99 wt %, or 90 wt % to 99 wt %, based on a total weight of organic solids. For example, the sum of the content of lysine and the content of citric acid in the adhesive composition for labels is 10 parts by weight to 99 parts by weight, 20 parts by weight to 99 parts by weight, 30 parts by weight to 99 parts by weight, 40 parts by weight to 99 parts by weight, 50 parts by weight to 99 parts by weight, 60 parts by weight to 99 parts by weight, 70 parts by weight to 99 parts by weight, 80 parts by weight to 98 parts by weight, or 85 parts by weight to 97 parts by weight, based on a total weight of organic solids. Since the content of the salt of lysine and citric acid is within the above range, adhesion and water removability is further improved. The organic solids include, for example, a salt of lysine and citric acid.

In the adhesive composition for labels, for example, precipitates are free in the composition. Since the adhesive composition for labels does not include precipitates, further improved adhesion is provided.

The precipitate may be at least one selected from a lysine precipitate, a citric acid precipitate, and a chitosan precipitate. For example, the precipitates may include a water-insoluble salt AB(s) obtained via chemical changes of an aqueous solution of lysine A(aq) and an aqueous solution of citric acid B(aq) as shown in Reaction Scheme 1 below, a solid of lysine A(s) or citric acid B(s) precipitated from an aqueous solution of lysine A(aq) or citric acid B(aq) as shown in Reaction Scheme 2 below, and a solid of lysine A(s) or citric acid B(s) not dissolved in a solvent but remaining in an insoluble state. Further, the precipitates include solids of chitosan or citric acid not dissolved in a solvent but remaining in an insoluble state.

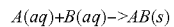  [Reaction Scheme 1]

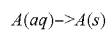  [Reaction Scheme 2]

The "precipitates" used herein may refer to precipitates formed selected from before the adhesive composition being applied to the substrate or adherend, during storage of the adhesive composition, and distribution of the adhesive composition.

Throughout the specification, the term "lysine" refers to a basic α-amino acid, and lysine may be biosynthesized from oxlaloacetic acid via a lysine biosynthetic pathway or chemically synthesized.

Lysine may include one type of lysine or a mixture of at least two types of lysine.

Lysine may include at least one of L-lysine represented by Formula 1 below, D-lysine represented by Formula 2 below, and salts thereof.

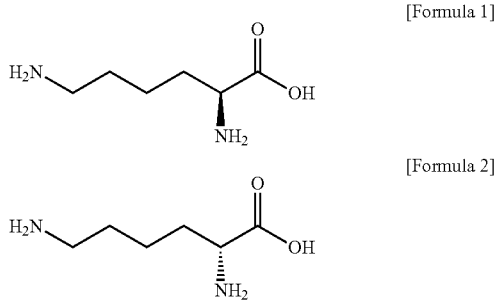

Examples of the lysine salts may include lysine sulfate, lysine acetate, lysine monohydrochloride, lysine dihydrochloride, lysine monohydrate, lysine acetylsalicylate, lysine phosphate, lysine diphosphate, mixtures thereof, and combinations thereof. These lysine salts may be converted into lysine free forms.

Methods of converting lysine salts into lysine free forms are well known in the art. Also, commercially available lysine raw materials may be used. For example, the lysine may be D-lysine, L-lysine, and/or DL-lysine. Since physicochemical properties thereof are the same or similar, characteristics of adhesive compositions including the same are also the same or similar, and thus they may be included in the scope of the present disclosure.

Citric acid, which is one of organic acids, is represented by Formula 3 below.

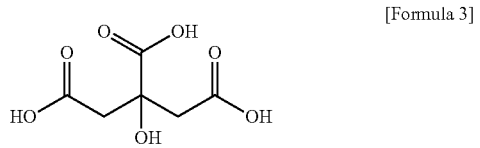 [SMILES: O=C(O)CC(O)(CC(=O)O)C(=O)O]

In the adhesive composition for labels, the salt of lysine and citric acid is present in the form of a salt solution. When lysine, citric acid, water, and chitosan are mixed, lysine and citric acid are present in the form of a salt solution without forming a covalent compound or an insoluble salt.

In the adhesive composition for labels, the contents of lysine, citric acid, water, and chitosan may be controlled such that lysine and citric acid are not formed into crystals or precipitates. When the adhesive composition for labels is maintained in a liquid state without forming crystals or precipitates, it is easy for the composition to be uniformly applied onto the substrate.

The mixing molar ratio of lysine and citric acid may be 1:1 to 1:7. For example, the mixing molar ratio of lysine and citric acid may be 1:1 to 1:6.5, 1:1 to 1:6, 1:1 to 1:5, 1:1 to 1:4, 1:1 to 1:3, 1:1 to 1:2, or 1:1 to 1:1.15.

When the content of lysine to citric acid is more than or less than the above range, the precipitates are formed in the composition, thereby deteriorating the storage stability or preservation stability of the adhesive composition.

The content of solids including a salt of lysine and citric acid and chitosan in the adhesive composition for labels is 70 parts by weight or less, for example, 0.1 parts by weight to 70 parts by weight, 1 part by weight to 70 parts by weight, or 10 parts by weight to 70 parts by weight. When the content of solids is within the above range, it is easy to apply the adhesive composition for labels to the substrate, and when the content of solids is 70 parts by weight or more, precipitates are formed, and thus it may be difficult for the solids to be used for the adhesive composition. Even when the content of solids decreases, precipitates are not formed in the composition or the composition does not lose adhesion, so that the content of solids may be adjusted to 0.1 parts by weight to 10 parts by weight according to application fields.

The adhesive composition for labels may include citric acid and lysine in the form of a condensate containing citric acid and lysine as monomers. For example, the condensate may be a dimer, a trimer, or an oligomer. The content of the condensate may be 20 parts by weight or less, 10 parts by weight or less, or 1 part by weight or less, each including 0, based on 100 parts by weight of the sum of the content of citric acid and the content of lysine. When the content of the condensate exceeds the above range, the adhesion of the adhesive composition may be deteriorated, and the liquid state of the adhesive composition may not be maintained.

The reason why the adhesive composition for labels exhibits the above-mentioned adhesion will be described in more detail. This description of adhesion is merely for understanding, and the scope of the present disclosure is not limited to the scope of such interpretation. Adhesion may be explained for other reasons within the scope of no scientific contradiction. The salt of lysine and citric acid forms a type of network by the strong interaction between lysine and citric acid, between lysine and citric acid or water or between lysine and citric acid, water, or thickener to provide adhesion to the composition. Lysine has two amino acids, and citric acid has three carbonyl groups. An unshared electron pair of oxygen of a carbonyl group of citric acid may interact with hydrogen of an amino group of lysine through an ionic hydrogen bond. An unshared electron pair of oxygen of a carbonyl group of citric acid, hydrogen of an amino group of lysine, and water may interact with each other through an ionic hydrogen bond. When components of the adhesive composition for labels are analyzed by liquid chromatography or the like, lysine and citric acid may be identified as raw materials. Thus, the lysine and citric acid in the adhesive composition for labels are bonded to each other through an ionic hydrogen bond, and is present in the form of a salt of lysine and citric acid, that is, a salt solution of lysine and citric acid. In the adhesive composition for labels, the salt of lysine and citric acid may have excellent adhesive properties while being maintained in a liquid state at room temperature (25° C.) without being forming crystals (solid state) or precipitates.

The adhesive composition for labels may further include at least one alcohol solvent selected from a primary alcohol, a polyhydric alcohol, a diol, and a triol. When an alcohol solvent is further added to the adhesive composition in which water is used as a solvent, a drying rate of the adhesive composition may be increased and processability of the adhesive composition may be improved.

In the adhesive composition for labels, the mixing weight ratio of deionized water to alcohol is 1:1 to 10:0, 1:1 to 10:1, 1:1 to 5:1, or 1:1 to 3:2. As the content of alcohol increases in the adhesive composition, the adhesive composition is more efficiently dried and has better coating, thereby increasing peel strength. However, when the content of alcohol is 1.5 times or more than that of deionized water in the adhesive composition, phase separation may occur in the adhesive composition.

The alcohol solvent may be a monohydric alcohol, a polyhydric alcohol, an unsaturated aliphatic alcohol, an alicyclic alcohol, or a mixture thereof. The monohydric alcohol may include at least one selected from methanol, ethanol, propane-2-ol, butane-1-ol, pentane-1-ol, and hexadecane-1-ol. The polyhydric alcohol may include at least one selected from ethane-1,2-diol, propane-1,2-diol, propane-1,2,3-triol, butane-1,3-diol, butane-1,2,3,4-tetraol, pentane-1,2,3,4,5-pentol, hexane-1,2,3,4,5,6-hexol, and heptane-1,2,3,4,5,6,7-heptol. The unsaturated aliphatic alcohol may include at least one selected from prop-2-ene-1-ol, 3,7-dimethylocta-2,6-dien-1-ol, prop-2-yn-1-ol, cyclohexane-1,2,3,4,5,6-hexol, and 2-(2-propyl)-5-methyl-cyclohexane-1-ol. The alicyclic alcohol includes at least one selected from cyclopentanol, cyclohexanol, and cycloheptanol.

The pH of the adhesive composition for labels is 1 to 11, 2 to 11, 2 to 9.5, or 2 to 8.5. Since the adhesive composition for labels has such a pH range, the storage stability and preservation stability of the adhesive composition are improved, and the long-term storability of the adhesive composition is improved. The adhesive composition for labels may have excellent adhesion without forming precipitates when used not only immediately after production but also after long-term storage. For example, since the adhesive composition for labels is stable after being stored or distributed for 14 days or more, 2 months or more, 6 months or more, 12 months or more, for 24 months or more, precipitates may not be formed, and physical properties thereof may be maintained. The temperature of an environment in which the adhesive composition for labels is stored may be from −18° C. to 80° C., particularly, −18° C. to 45° C., 0° C. to 60° C., 0° C. to 45° C., 0° C. to 40° C., or 20° C. to 40° C. Although the adhesive composition for labels is stored in a temperature out of the temperature ranges above, formulation and quality of the adhesive composition may not be affected so long as a temperature of an environment in which the adhesive composition for labels is used is within the ranges above. For example, when the adhesive composition for labels is stored at a low temperature, the adhesive composition may be used after being maintained at room temperature for a predetermined time before use.

The viscosity of the adhesive composition for labels may be, for example, 1000 mPa·s or more, 2000 mPa·s or more, 5000 mPa·s or more, 10000 mPa·s or more, 15000 mPa·s or more, 20000 mPa·s or more, 30000 mPa·s or more, 40000 mPa·s or more, 50000 mPa·s or more, 60000 mPa·s or more, 70000 mPa·s or more, 80000 mPa·s or more, 90000 mPa·s or more, 100000 mPa·s or more, 120000 mPa·s or more, 140000 mPa·s or more, 160000 mPa·s or more, or 180000 mPa·s or more.

The initial tack of the adhesive composition for labels may be, for example, 3.0 mJ or more, 3.5 mJ or more, 4.0 mJ or more, 4.5 mJ or more, 5.0 mJ or more, 5.5 mJ or more, 6.0 mJ or more, 6.5 mJ or more, or 7.0 mJ or more.

Since the adhesive composition for labels includes chitosan, the adhesive composition provides improved viscosity and/or initial tack as compared with a composition including only a salt of lysine and citric acid.

When the content of solids of the salt of lysine and citric acid is 0.1 parts by weight or more based on 100 parts by weight of the adhesive composition for labels and the content of chitosan is 3 wt % or more, the label separation delay time of the adhesive composition for labels is 1 minute or more, 5 minutes or more, 10 minutes or more, 30 minutes or more, 50 minutes or more, 70 minutes or more, 90 minutes or more, or 100 minutes or more, as compared with Control A of Example 2. For example, when the content of solids of the salt of lysine and citric acid is 0.1 parts by weight or more based on 100 parts by weight of the adhesive composition for labels, the label separation delay time of the adhesive composition for labels is 1.0 minute to 300 minutes, 1.0 minute to 200 minutes, or 1.0 minute to 180 minutes.

The adhesive composition for labels, if necessary, may further include at least one additive selected from a reactive diluent, an emulsifier, a tackifier, a plasticizer, a filler, an antiaging agent, a curing accelerator, a flame retardant, a coagulant, a surfactant, a thickener, an UV screening agent, an elastomer, a pigment, a dye, a flavoring agent, an antistatic agent, an antiblocking agent, a slip agent, an inorganic filler, a kneading agent, a stabilizer, a modifying resin, a coupling agent, a levelling agent, a fluorescent whitening agent, a dispersant, a thermal stabilizer a photostabilizer, an UV absorbent, a wax, a wetting agent, an antioxidant, a preservative, and a lubricant. Although the total amount of the additives is not particularly limited, and various additives may be included in various weight ranges according to field of application. The additives may be used in amounts commonly used in the art, respectively.

The reactive diluent is a diluent assisting each component of the composition to be uniformly applied to an article to which the composition is applied and including at least one selected from, for example, n-butylglycidylether, aliphaticglycidylether, 2-ethylhexylglycidylether, phenylglycidylether, o-cresylglycidylether, nonylphenylglycidylether, p-tertbutylphenylglycidylether, 1,4-butanedioldiglycidylether, 1,6-hexanedioldiglycidylether, neopentylglycidylether, 1,4-cyclohexanedimethyloldiglycidylether, polypropyleneglycoldiglycidylether, ethyleneglycoldiglycidylether, polyethyleneglycoldiglycidylether, diethyleneglycoldiglycidylether, resorcinoldiglycidylether, hydrogenated bisphenol-A glycidylether, trimethylolpropenetriglycidylether, glycerolpolyglycidylether, diglycerolpolyglycidylether, pentaerythritolpolyglycidylether, castor oil glycidylether, sorbitolpolyglycidylether, neodecanoic acid glycidylether, diglycidyl-1,2-cyclohexanedicarboxylate, diglycidyl-o-phthalate, N, N-diglycidylamine, N, N-diglycidyl-o-toluidine, triglycidyl-p-aminophenol, tetraglycidyldiaminodiphenylmethane, triglycidyl-isocyanate, 1,4-butanedioldiglycidylether, 1,6-hexanedioldiglycidylether, polypropyleneglycidyldiglycidylether, and triethylolpropenetriglycidylether.

The emulsifier may include at least one selected from a copolymer of polyoxyethylene and polyoxypropylene, a copolymer of polyoxyethylene and polyoctylphenylether, and sodiumdodecylbenzenesulfide.

Examples of the tackifier may be rosin and modified products thereof (e.g.: rosin, hydrogenated rosin, polymerized rosin, maleated rosin, rosin glycerin, and rosin modified phenolic resin), a terpene-based resin (e.g.: a terpene resin, a terpene-phenol resin, a terpene-styrene resin, and a terpene-phenolic resin), a petroleum resin (e.g.: a C5 petroleum resin, a C9 resin, a bicyclic ronadiene petroleum resin, a hydrogenated petroleum resin, and a styrene-terpene resin), a phenolic resin, a polymethylstyrene resin, a ketonealdehyde resin, a xylene formaldehyde resin, a Cashew oil modified phenolic resin, a Tall oil modified phenolic resin, rubber, a resin emulsion (e.g.: a rosin emulsion, a TPR water based resin, a 2402 resin emulsion, and a petroleum resin emulsion), a coumarone indene resin, and the like.

The plasticizer may improve processing flow or elongation. The plasticizer may also improve functions of the composition, such as electric insulation, adhesion, cold resistance, light resistance, oil resistance, resistance to saponification, flame retardancy, thermal stability, easy processability (intramolecular activity), activity (intermolecular activity), and non-toxicity.

A plasticizer to improve cold resistance may include dioctyl adipate (DOA), dioctyl azelate (DOZ), dioctyl sebacate (DOS), Flexol TOF (UCC company), polyethyleneglycolester, and the like. A plasticizer to improve heat resistance (non-volatility) and non-transmutation may include a polymer blend such as polyester and nitrile-butadiene rubber (NBR), trimellitic ester, and pentaerythritol ester. A plasticizer to improve light resistance may include DOP, DOA, DOS, polyester, and epoxidized soybean oil (ESBO).

A plasticizer to improve oil resistance may include Phosflex aromatic phosphate ester (Product Name: TPP, TCP, 112 (CDP), and 179A (TXP)), polyester, NBR, and the like. A plasticizer to improve resistance to saponification may include TCP, ESBO, polyester, and the like.

A plasticizer to improve flame retardancy may include phosphate such as TCP and TXP, chlorinated paraffin, chlorinated alkylstearate, NBR, and the like. A plasticizer to improve thermal stability may include ESBO, DOZ, DOS, DOP, polyethyleneglycol ester, and the like.

A plasticizer to improve easy processability may include DOA, BBP, TOF, TCP, octyldiphenyl phosphate, and the like. A plasticizer to improve activity may include DOZ, DOS, dibasic lead phosphate (DLP), ESBO, polyethyleneglycolester, and the like.

A plasticizer for non-toxicity may include BPBG, octyldiphenyl phosphate, ESBO, ester of citric acid, NBR, and the like.

Particularly, examples of the plasticizer may include dibutylphthalate (DBP), dihexylphthalate (DHP), di-2-ethylhexylphthalate (DOP), di-n-octylphthalate (DnOP), diisooctylphthalate (DIOP), didecylphthalate (DDP), diisodecylphthalate (DIDP), C8-C10 mixed higher alcohol phthalate, butylbenzyl phthalate (BBP), dioctyladipate (DOA), dioctylazelate (DOZ), dioctylsebacate (DOS), tricresyl phosphate (TCP), trixylenyl phosphate (TXP), monooctyldiphenylphosphate (Santicizer141), monobutyldixylenyl phosphate, trioctylphosphate (TOF), aromatic oil, polybutene, paraffin, and the like.

Examples of the thickener may include alginin, alginic acid, sodium alginate, guar gum, xanthan gum, collagen, alginate, gelatin, furcellaran, agar, carrageenan, casein, locust bean gum, pectin, polyethyleneoxide, polyethyleneglycol, polyvinylalcohol, and polyvinylpyrrolidone.

The surfactant may be any surfactant commonly used in the art. For example, the surfactant may be a $C_8$-$C_{18}$ alkyl sulfate, a $C_8$-$C_{18}$ alkyl ether sulfate or alkylaryl ether sulfate having 40 or less of ethyleneoxide units or propyleneoxide units in hydrophobic groups, a $C_8$-$C_{18}$ alkyl sulfonate, an alkylaryl sulfonate, an ester and semester of sulfosuccinic acid having monohydric alcohol or alkylphenol, a $C_8$-$C_{40}$ alkyl polyglycol ether or alkylaryl polyglycol ether having ethyleneoxide units, or the like. For example, sodium dodecyl sulfate (SDS), sodium-silicate, and the like may be used therefor.

The filler is added to improve strength, durability, and workability of the composition. Examples of the filler may include calcium carbonate, talc, ceramic, silica, dolomite, clay, titanium white, flowers of zinc, carbon (preventing shrinkage or blocking), potassium carbonate, titanium oxide, liquid polysulfide polymer, volatile diluent, magnesium oxide, processing oil, and the like.

The curing accelerator may be, for example, dibutyltin dilaurate, JCS-50 (Johoku Chemical Company Ltd.), or Formate TK-1 (Mitsui Chemical Polyurethane Corporation). The antioxidant may be, for example, dibutyl hydroxy toluene (BHT), IRGANOX® 1010, IRGANOX® 1035FF, or IRGANOX® 565 (all manufactured by Chiba Specialty Chemicals).

The antistatic agent is not particularly limited and examples thereof may include 1-hexyl-4-methylpyridinium hexafluorophosphate, dodecylpyridinium hexafluorophosphate, a fluorinated organometallic compound (e.g., HQ-115 of 3M), an alkali metal salt (e.g., $NaPF_6$, $NaSbF_6$, $KPF_6$, and $KSbF_6$), a conductive polymer (e.g., polythiophene (PEDOT of Bayer), polyaniline, and polypyrrole), a metal oxide (e.g., indium-doped tin oxide (ITO), antimony-doped tin oxide (ATO), tin oxide, zinc oxide, antimony oxide, and indium oxide), a quaternary ammonium salt (e.g., poly(acrylamide-co-diallyldimethyl ammonium chloride) solution of Sigma-Aldrich), 1-butyl-3-m ethylimidazolium hexafluorophosphate [BMIM][$PF_6$], 1-butyl-3-(2-hydroxyethyl) imidazolium bis(trifluoromethane sulfonyl)imide [BHEIM][$NTf_2$], and tetrabutylmethylammonium bis(trifluoromethanesulfonyl)imide [TBMA][$NTf_2$] which may be used alone or in combination of at least two thereof.

The elastomer refers to a rubber or a polymer having properties of an elastomer and may be, for example, ethylene-vinyl acetate copolymer, acrylic rubber, natural rubber, isoprene rubber, styrene butadiene rubber, chloroprene rubber, butyl rubber, ethylene propylene rubber, styrene-ethylene-butylene-styrene copolymer, or acrylonitrile-butadiene copolymer.

The stabilizer stabilizes the adhesive force of the adhesive composition or the like and examples thereof may include polyhydric alcohol, polyvalent amine, or the like For example, at least one selected from alkylene glycol, dialkylene glycol, benzenediol, benzenetriol, dialcoholamine, trialcoholamine, arabitol, mannitol, isomalt, glycerol, xylitol, sorbitol, maltitol, erythritol, ribitol, dulcitol, lactitol, threitol, iditol, polyglycitol, alkylene diamine, alkenylene diamine, phenylene diamine, and n-aminoalkylalkane diamine may be used therefor.

The fluorescent whitening agent may be a benzooxazole compound, a benzothiazole compound, a benzoimidazole compound, or the like.

The pigment may be a natural pigment or a synthetic pigment or an inorganic pigment or an organic pigment classified by another criterion.

The flavoring agent may be, for example, but is not limited to, peppermint oil, spearmint oil, carvone, or menthol, used alone or in combination.

The flame retardant may be melamine cyanurate, magnesium hydroxide, agalmatolite, zeolite, sodium silicate, aluminum hydroxide, antimony (antimony trioxide), or the like. An additive to improve water resistance may be glyoxal.

Examples of the modifying resin may include a polyol resin, a phenol resin, an acrylic resin, a polyester resin, a polyolefin resin, an epoxy resin, and an epoxidized polybutadiene resin.

The coupling agent may improve adhesion and adhesion reliability between the adhesive composition and a packaging material. When the coupling agent is added, adhesion reliability may be improved in the case where a composition is maintained under high-temperature and/or high-humidity conditions for a long period of time. Examples of the coupling agent may include a silane compound such as γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyaceto trimethoxy silane.

The kneading agent may be aromatic hydrocarbon resin.

The antiaging agent may be N-(1,3-dimethylbutyl)-N'-phenyl-p-phenylene diamine.

The wetting agent may be, for example, sugar, glycerin, a sorbitol aqueous solution, or an amorphous sorbitol aqueous solution, used alone or in combination.

The UV absorbent may be ethylhexyl methoxycinnamate (e.g., 2-ethylhexyl 4-methoxycinnamate), ethylhexylsalicylate, 4-methylbenzylidene camphor, isoamyl p-methoxycinnamate, octocrylene, phenylbenzimidazole sulfonic acid, homosalate, cynoxate, ethylhexyltriazone, polysilicone-15, TEA-salicylate, PABA, ethylhexyldimethyl PABA, glyceryl PABA, or the like. These compounds may be used alone or in combination of two or more.

The adhesive composition or adhesive product according to the present disclosure may further include additives disclosed in U.S. Pat. No. 4,959,412, CA1278132, U.S. Pat. No. 6,777,465, WO2007-120653, US2003-0064178, U.S. Pat. Nos. 7,306,844, 7,939,145, WO2011-136568, WO2010-071298, Korean Patent Application Publication No. 2016-0095132, Japanese Patent Application Publication No. 5959867, Korean Patent No. 989942, which are hereby incorporated by reference, in addition to the above-described additives.

A method of preparing an adhesive composition for labels according to another embodiment includes: mixing lysine, citric acid, chitosan, and water; and stirring the mixture at 80° C. or lower.

First, lysine, citric acid, chitosan, and water are mixed to obtain a mixture, and the obtained mixture is stirred at 80° C. or lower to prepare an adhesive composition for labels.

When the step of stirring the mixture at 80° C. or lower is carried out outside the above temperature range, side reaction materials, impurities and the like may be formed, and in some cases, it may be difficult to obtain an adhesive composition having targeted adhesion. The step of stirring the mixture at 80° C. or lower is performed at 0° C. to 80° C., 0° C. to 75° C., 0° C. to 70° C., 0° C. to 65° C., or 0° C. to 60° C. The step of stirring the mixture at 80° C. or lower includes i) a first step of stirring the mixture at 0° C. to 80° C., 0° C. to 75° C., 0° C. to 70° C., or 0° C. to 65° C., and ii) a second step of cooling the mixture to room temperature (20° C. to 30° C.). When mixing lysine, citric acid, chitosan and water, citric acid and chitosan may be added to an aqueous solution of lysine, or lysine, citric acid, chitosan and water may be simultaneously mixed. Chitosan is used in the form of a chitosan solution in which chitosan is dissolved in water or chitosan and citric acid are dissolved in water. In order to control the content of solids of the adhesive composition for labels to a predetermined range, a process of concentrating the adhesive composition under reduced pressure to remove water and the solvent may be further performed. The contents of lysine, citric acid and chitosan that are used are determined depending on the composition required in the above adhesive composition for labels.

The mixing molar ratio of lysine and citric acid may be 1:1 to 1:7. For example, the mixing molar ratio of lysine and citric acid may be 1:1 to 1:6.5, 1:1 to 1:6, 1:1 to 1:5, 1:1 to 1:4, 1:1 to 1:3, 1:1 to 1:2, or 1:1 to 1.15.

When the content of lysine to citric acid is more than or less than the above range, the precipitates are formed in the composition, thereby deteriorating the storage stability or preservation stability of the adhesive composition.

An adhesive sheet according to another embodiment includes: a first substrate; and an adhesive layer disposed on one surface of the first substrate, wherein the adhesive layer includes the above adhesive composition for labels.

Since the adhesive sheet includes the adhesive layer, the adhesive sheet may be attached to various other substrates. The adhesive layer is obtained by applying the above adhesive composition onto the first substrate. The solvent in the composition is partially or entirely removed. Drying temperature is, for example, 25° C. to 45° C. The first substrate is, for example, a flexible substrate such as a paper or a polymer. Alternatively, the first substrate is a rigid substrate such as a metal. The adhesive sheet is, for example, a label paper in which an adhesive layer is disposed on a paper, or an OPP film in which an adhesive layer is disposed on a polymer film.

The adhesive sheet may further include a release layer disposed on the adhesive layer. Since the adhesive sheet further includes a release layer, the adhesive sheet is easily stored and transported. When the adhesive sheet is used, the adhesive sheet is attached to various substrates after removing the release layer. The structure and material of the release layer is not particularly limited, and any structure and any material may be used as long as they can be used in the release layer. The release layer includes an adhesive layer and a polymer having low adhesion.

An article according to another embodiment includes: a second substrate; and the above adhesive sheet disposed on one surface of the second substrate. The adhesive sheet includes a first substrate and an adhesive layer. The first substrate and the second substrate may be each independently selected from paper, a polymer film, glass, wood, metal, plastic, alloy, ceramic, or fiber. The first substrate and the second substrate are the same as or different from each other. The first substrate is a flexible substrate such as paper or a polymer film, and the second substrate is a non-flexible substrate such as a glass bottle or a plastic container. Alternatively, the first substrate is a flexible substrate such as paper or a polymer film, and the second substrate is a non-flexible substrate such as a cloth.

The article is placed in a shaking incubator that performs stirring at a speed of 200 rpm at 10° C. to 15° C. When the article is completely immersed in distilled water, the time taken for the first substrate to separate from the second substrate is, for example, 10 minutes or more, 20 minutes or more, or 30 minutes or more. Under the same conditions, the time taken for the first substrate to separate from the second substrate is, for example, 10 minutes to 12 hours, 20 minutes to 6 hours, or 30 minutes to 3 hours. Since the adhesive layer includes the above adhesive composition for labels, water removability is easily adjusted.

Mode of Disclosure

Hereinafter, one or more embodiments of the present disclosure will be described in detail with reference to the following examples. These examples are not intended to limit the purpose and scope of the one or more example embodiments of the present disclosure.

[Example 1] Preparation of Adhesive Composition for Labels Including Salt of Lysine and Citric Acid, and Polymer Composition a-1:

113.6 g of distilled water (DIW) was added to 24 g of a 56 wt % aqueous solution of L-lysine free form while stirring the mixture at room temperature (25° C.) for 30 minutes to dilute lysine. 10.608 g of citric acid (CA) and 73.422 g of a chitosan solution were slowly added to the diluted lysine at room temperature (25° C.) for 1 hour while stirring and then the mixture was further stirred at 60° C. for 1 hour. Then, the reaction mixture was cooled to room temperature (25° C.) to terminate the reaction and obtain 221.63 g of an adhesive composition. The content of solids of lysine and citric acid in this composition is about 30 parts by weight based on 100 parts by weight of the composition, the mixing molar ratio of lysine and citric acid is 1:3, the content of chitosan is 1.17 wt %, and the solvent is deionized water. The chitosan solution is a transparent solution obtained by adding 42.43 g of citric acid to 28.4 g of distilled water, slowly introducing 2.59 g of chitosan at 60° C., and then stirring the mixture for 30 minutes. The deacetylation (DAC) rate of chitosan was 85%.

Compositions a-2 to d-4

Adhesive compositions were prepared in the same manner as in Composition a-1, except that the content of solids of lysine and citric acid, the molar ratio of lysine and citric acid, and the content of chitosan were changed. Specific compositions are given in Table 1 to 4 below.

[Example 2] Evaluation of Precipitate Formation, Water Removability, Viscosity and Initial Tack Adhesive compositions (a-1 to c-4 below) were prepared according to the method described in Example 1.

As Control A, a commercially available polyvinyl alcohol-based adhesive (J-POVAL JP-18, Japan VAM & Poval Co., Ltd.) was used.

The water removability, viscosity and initial tack of each of the adhesive compositions were evaluated according the following method, and the evaluation results thereof are given in Tables 1 to 3 below. In Tables 1 to 3, the solid content is a solid content by the salt of lysine and citric acid.

1) Precipitate Formation

The precipitate formation of the composition prepared in Example 10 was evaluated. Specifically, each of the compositions was applied onto an OPP film having thickness of 50 μm (Samyoung Chemical Co., Ltd.) to a thickness of about 50 μm using a bar coater. The film coated with the composition was left at room temperature (25° C.) under a relative humidity condition of 60±10%, and then the surface change of the adhesive composition applied on the OPP film was observed, and the shape change thereof was evaluated. Evaluation results thereof are given in Tables 1 to 3.

2) Water Removability

Each of the prepared adhesive composition and the composition of Control 3 was applied onto one surface of a paper label having a width of 1.5 cm and a length of 10 cm to a thickness of about 50 μm using a bar coater, and then the paper label coated with each of the compositions was attached to a slide glass, pressed two times by a pressure of 2 kgf, and dried at room temperature for 24 hours to prepare samples.

Each of the samples was completely immersed in distilled water (DIVV) under conditions of normal temperature, normal pressure and neutral pH, and then the time taken for the paper label to completely separate from the slide glass was measured while stirring each of the samples at a speed of 200 rpm at 10° C. to 15° C. using a shaking incubator.

3) Evaluation of Viscosity

The viscosity of each of the compositions was measured using a rotary viscometer (brand name: RM200 TOUCH CP400 or RM200 TOUCH, manufactured by LAMYRHEOLOGY) under conditions of 25±1° C., LV-1 type spindle, and 60 rpm.

Evaluation results thereof are given in Table 4 below.

4) Initial Tack

The initial tacks of the adhesive compositions were measured and compared using a rheometer manufactured by Anton Paar Corporation. A SUS-material probe having a diameter of 25 mm was brought into contact with each of the adhesive compositions to maintain a gap of 0.01 mm, and then a force generated by peeling the probe at the same speed was measured to perform the quantitative evaluation of the initial tacks of the adhesive compositions instantaneously. Evaluation results thereof are given in Table 4 below.

TABLE 1

| | Content of solids of salt of lysine and citric acid (wt %) | Lysine:CA (molar ratio) | Content of chitosan [wt %] | Precipitate formation | Separation time [min] |
|---|---|---|---|---|---|
| a-1 | 30 | 1:3 | 1.17 | No | 16 |
| a-2 | 40 | 1:3 | 1.17 | No | 15 |
| a-3 | 50 | 1:3 | 1.17 | No | 16 |

As given in Table 1, when the molar ratio of lysine and citric acid is 1:3 and the content of chitosan is 1.17 wt %, there is no difference of water removability according to the change in the content of solids.

TABLE 2

| | Content of solids of salt of lysine and citric acid (wt %) | Lysine:CA (molar ratio) | Content of chitosan [wt %] | Precipitate formation | Separation time [min] |
|---|---|---|---|---|---|
| b-1 | 40 | 1:3 | 1 | No | 15 |
| b-2 | 40 | 1:3 | 2 | No | 28 |
| b-3 | 40 | 1:3 | 3 | No | 60 |
| b-4 | 40 | 1:3 | 4 | No | 87 |
| b-5 | 40 | 1:3 | 5 | No | 120 |
| b-6 | 40 | 1:3 | 6 | No | 142 |
| b-7 | 40 | 1:3 | 7 | No | 168 |
| b-8 | 40 | 1:3 | 8 | Yes | — |
| Control A | 15 | — | — | No | 38 |

As given in Table 2, when the molar ratio of lysine and citric acid is 1:3 and the content of solids thereof was 40 wt %, as the content of chitosan was increased to 7 wt %, label separation time was delayed, and thus water resistance was increased in proportion to the delay of label separation time. When chitosan was added to 8 wt %, precipitates were formed in the adhesive composition for labels. When the content of chitosan in the adhesive composition is 3 wt % to 7 wt %, the adhesive composition exhibited excellent water resistance.

TABLE 3

| | Content of solids of salt of lysine and citric acid (wt %) | Lysine:CA (molar ratio) | Content of chitosan [wt %] | Precipitate formation | Separation time [min] |
|---|---|---|---|---|---|
| c-1 | 40 | 3:1 | 5 | No | 5 |
| c-2 | 40 | 1:1 | 5 | No | 28 |
| c-3 | 40 | 1:1.5 | 5 | No | 46 |
| c-4 | 40 | 1:3 | 5 | No | 120 |
| c-5 | 40 | 1:5 | 5 | No | 136 |
| c-6 | 40 | 1:7 | 5 | No | 30 |
| c-7 | 40 | 1:10 | 5 | No | 15 |
| Control A | 15 | — | — | No | 38 |

As given in Table 3, when the molar ratio of lysine and citric acid is in a range of 1:1.5 to 1:5 and the content of solids thereof was 40 wt %, the label separation time of the adhesive composition is delayed as compared with that of Control A, and thus the adhesive composition exhibited excellent water resistance.

Further, since the adhesive composition of the present disclosure includes a natural material, the adhesive composition does not pollute environments even after it is dissolved in water.

TABLE 4

| | Content of solids of salt of lysine and citric acid (wt %) | Lysine:CA (molar ratio) | Content of chitosan [wt %] | Viscosity (mPa · s) | Initial tack (mJ) |
|---|---|---|---|---|---|
| d-1 | 40 | 1:1.5 | 5 | 63,510 | 4.11 |
| d-2 | 40 | 1:3 | 5 | 55,680 | 3.53 |
| d-3 | 50 | 1:1.5 | 5 | 182,200 | 7.77 |
| d-4 | 50 | 1:3 | 5 | 142,122 | 5.98 |
| Control A | 15 | — | — | 10,850 | 2.4 |

As given in Table 4, the adhesive composition for labels of the present disclosure exhibited more excellent initial tack than Control A.

[Reference Example 1] Evaluation of Stability of Composition Including Lysine and Organic Acid (Composition Having Molar Ratio of Lysine and Citric Acid=1:1)

79 g of distilled water (DIW) was added to 100 g of a 54 wt % aqueous solution of L-lysine free form while stirring the mixture at room temperature (25° C.) for 30 minutes to dilute lysine. 70.97 g of citric acid was slowly added to the diluted lysine at room temperature (25° C.) for 1 hour while stirring, and then the mixture was further stirred at 60° C. for 1 hour. Then, the reaction mixture was cooled to room temperature (25° C.) to terminate the reaction and obtain 249.93 g of an adhesive composition. The content of solids in this composition was about 50 parts by weight based on 100 parts by weight of the composition, the mixing molar ratio of lysine to citric acid was 1:1, and deionized water was used as a solvent.

(Composition Having Molar Ratio of Lysine and Another Organic Acid=1:1)

In the same manner as the above method, compositions were prepared by changing the kind of organic acids.

Compositions were prepared in the same manner as in Example 1, except that acetic acid, glutamic acid, tartaric acid, aspartic acid, fumaric acid, glyoxylic acid, 4-ketopimelic acid, pyruvic acid, and 1,3-acetonedicarboxylic acid were respectively used instead of citric acid.

(Evaluation of Precipitate Formation)

Formation of precipitates of the prepared compositions was evaluated. Particularly, each of the compositions was applied onto an OPP film (Sam Young Chemical Co., Ltd.) having a thickness of 50 μm to a thickness of about 50 μm by using a bar coater. After the film coated with the composition was maintained under conditions of room temperature (25° C.) and a relative humidity of 60±10% for 14 days, changes on the surface of the adhesive composition present on the OPP film were observed and changes in shape thereof were evaluated.

Precipitates were not formed in the composition including lysine and citric acid, whereas precipitates were formed in the compositions including the other organic acids and lysine to make the evaluation of adhesion impossible.

In the case where compositions are prepared by mixing lysine and various organic acids, it was confirmed that not all of the compositions have adhesiveness without forming precipitates.

[Reference Example 2] Evaluation of Solubility of Composition According to Solvent Adhesive compositions including lysine and citric acid were prepared in the same manner as in Reference Example 1. 25 g of an additional solvent was added to 50 g of each of the prepared adhesive compositions (molar ratio of lysine to citric acid=1:1 and solid content: 50 parts by weight), and the mixture was stirred for 1 hour. After stirring, the solubility of the adhesive composition to the additional solvent such as methanol, toluene, benzene, chloroform, methylene chloride, dichloromethane, tetrahydrofuran (THF), ethyl acetate, dimethylformamide (DMF), dimethylsulfoxide (DMSO), or n-hexane was evaluated. As the results of evaluation, the adhesive composition prepared in Example 1 was dissolved when methanol, which is an alcohol, was used as the additional solvent, but was precipitated without being dissolved in the above other additional organic solvents.

[Reference Example 3] Analysis of Shape, Viscosity and Initial Tack of Adhesive Composition According Solid Content Adhesive compositions including lysine and citric acid were prepared in the same manner as in Reference Example 1. The adhesive compositions were prepared such that the contents of solids in the adhesive compositions are 10 wt %, 20 wt %, 30 wt %, 40 wt %, 50 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, and 75 wt %, respectively. The contents of solids in Compositions 2-1 to 2-19 (molar ratio of lysine and citric acid is 1:1) were adjusted by the content of water.

1) Evaluation of Stability

Stability of the adhesive compositions having various molar ratios was evaluated according to the following method. About 1 g of each of the adhesive compositions was applied to an aluminum dish having a diameter of 5 cm. Then, the formation of precipitates was observed in the adhesive composition under conditions of room temperature (25° C.) and a relative humidity of 60±10% for 14 days.

2) Evaluation of Viscosity

The viscosity of each of the compositions was measured using a rotary viscometer (brand name: RM200 TOUCH CP400 or RM200 TOUCH, manufactured by LAMYRHE-OLOGY) under conditions of 25±1° C., LV-1 type spindle, and 60 rpm.

3) Evaluation of Initial Tack

Initial tacks of the compositions in which precipitates were not formed in the evaluation of stability were evaluated. The initial tacks of the adhesive compositions were measured and compared using a rheometer manufactured by Anton Paar Corporation. A SUS-material probe having a diameter of 25 mm was brought into contact with each of the adhesive compositions to maintain a gap of 0.01 mm, and then a force generated by peeling the probe at the same speed was measured to perform the quantitative evaluation of the initial tacks of the adhesive compositions instantaneously. Evaluation results thereof are given in Table 5 below.

TABLE 5

| No. | Lysine:CA (mol ratio) | Contents of solids (wt %) | Viscosity (mPa · s) | Initial tack (mJ) | Formation of precipitation (Y/N) |
|---|---|---|---|---|---|
| 2-1 | 1:1 | 10 | 10.08 | 0.21 | N |
| 2-2 | 1:1 | 20 | 11.84 | 0.217 | N |
| 2-3 | 1:1 | 30 | 13.54 | 0.216 | N |
| 2-4 | 1:1 | 40 | 16.24 | 0.22 | N |
| 2-5 | 1:1 | 50 | 26.68 | 0.222 | N |
| 2-6 | 1:1 | 60 | 85.28 | 0.523 | N |
| 2-7 | 1:1 | 61 | 91.45 | 0.562 | N |
| 2-8 | 1:1 | 62 | 99.13 | 0.614 | N |
| 2-9 | 1:1 | 63 | 115.22 | 0.652 | N |
| 2-10 | 1:1 | 64 | 125.35 | 0.751 | N |
| 2-11 | 1:1 | 65 | 168.5 | 0.783 | N |
| 2-12 | 1:1 | 66 | 184.15 | 0.899 | N |
| 2-13 | 1:1 | 67 | 233.56 | 0.921 | N |
| 2-14 | 1:1 | 68 | 290.52 | 1.12 | N |
| 2-15 | 1:1 | 69 | 424.2 | 1.24 | N |
| 2-16 | 1:1 | 70 | 657.67 | 1.48 | N |
| 2-17 | 1:1 | 71 | Presence of water-insoluble material (CA) | | |
| 2-18 | 1:1 | 72 | Presence of water-insoluble material (CA) | | |
| 2-19 | 1:1 | 75 | Presence of water-insoluble material (CA) | | |

Referring to Table 5, it was found that precipitates were formed when the content of solids in each of the compositions was 71 wt % or more, but precipitates were not formed and were maintained at a liquid phase when the content of solids in each of the compositions was 10 wt % to 70 wt %.

[Reference Example 4] Comparison of Initial Tack

The adhesion of a conventional adhesive was compared with the adhesion of the adhesive compositions of the present disclosure.

Adhesive compositions including lysine and citric acid were prepared according to the preparation method described in Reference Example 1. However, the content of water was adjusted such that the content of solids in each of the adhesive compositions is 10 wt %. (Composition 4-1 having molar ratio of lysine and citric acid=1:1)

After a commercially available polyvinyl alcohol-based adhesive (PVA 088-50, manufactured by Qingdao Sanhuan Colorchem Co., Ltd.) was prepared, an adhesive composition (hereinafter, referred to as Control 1) was prepared by adjusting the content of water such that the content of solids was 10 wt %.

The viscosity and initial tack of the adhesive composition of the present disclosure (solid content: 10 wt %) and the viscosity and initial tack of the Control 1 were evaluated in the same manner as the method described in Reference Example 3.

Evaluation results thereof are given in Table 6 below.

TABLE 6

| | Solid content (wt %) | Viscosity (mPa · s) | Initial tack (mJ) |
|---|---|---|---|
| 4-1 | 10 | 10.1 | 0.21 |
| Control 1 (PVA-based) | 10 | 43.49 | 0.201 |

Referring to Table 6, the adhesive composition according to the present disclosure showed the same level of initial tack as compared to the polyvinyl alcohol-based adhesive composition (Control 1).

[Reference Example 5] Evaluation of Peel Strength According to Solvent

Adhesive compositions (6-1 to 6-3 below) including lysine and citric acid were prepared according to the preparation method described in Reference Example 1. The adhesive compositions were prepared such that the molar ratios of lysine and citric acid are 1.5:1, 1:1, and 1:1.5. (Solid content: 50 parts by weight)

Adhesive compositions (6-4 to 6-6 below) including lysine and citric acid were prepared according to the preparation method described in Reference Example 1. The adhesive compositions were prepared such that the molar ratios of lysine and citric acid are 1.5:1, 1:1, and 1:1.5, and methanol was added as a solvent. The weight ratio of deionized water and methanol was set to 1:1. (Solid content: 50 parts by weight)

Adhesive compositions (6-7 to 6-8 below) including lysine and citric acid were prepared according to the preparation method described in Reference Example 1. Methanol was added in addition to deionized water, and the weight ratio of deionized water and methanol was set to 6:4 and 4:6. (Molar ratio of lysine and citric acid=1:1, solid content: 50 parts by weight)

As a Control, a commercially available acrylic adhesive (K901, Hansung P&I, hereinafter, referred to as Control 2, where the solid content was 59 wt %) was prepared. The peel strength and water removability of each of the adhesive compositions were evaluated according to the following method, and the evaluation results thereof are given in Table 7 below.

1) Peel Strength

After a PET film was prepared, a sample was applied onto the surface of the PET film (thickness: 50 μm) to a thickness of 11 μm using a bar coater (film size: 120 mm*25 mm, thickness: 38 μm, 50 μm). Then, the sample was dried in an oven at 60° C. for 4 minutes, and was then laminated together with the PET film using a dry laminator (roller speed: 1.9 m/min, roller temperature: 60° C.) The laminated sample was dried in an oven at 30° C. for 72 hours. The peel strength of the dried sample was measured according to ASTM D1876 "T peel strength measurement" method. Measurement results thereof are given in Table 7 below.

TABLE 7

| No. | Lysine:CA (molar ratio) | Solvent | Solid content (wt %) | Peel strength (N/25 mm) |
|---|---|---|---|---|
| 6-1 | 1.5:1 | DIW | 50 | 5.91 |
| 6-2 | 1:1 | | | 5.45 |

TABLE 7-continued

| No. | Lysine:CA (molar ratio) | Solvent | Solid content (wt %) | Peel strength (N/25 mm) |
|---|---|---|---|---|
| 6-3 | 1:1.5 | | | 4.92 |
| 6-4 | 1.5:1 | DIW and methanol (1:1 wt ratio) | | 7.11 |
| 6-5 | 1:1 | | | 6.92 |
| 6-6 | 1:1.5 | | | 6.18 |
| 6-7 | 1:1 | DIW and methanol (6:4 wt ratio) | | 6.28 |
| 6-8 | 1:1 | DIW and methanol (4:6 wt ratio) | | — |
| Control 2 (acryl-based) | — | | 59 | 6.61 |

Referring to Table 7, the PET film attached to stainless steel by the adhesive composition according to the present disclosure was separated within 1 hour, and the PET film provided similar peel strength even when it has a lower solid content than Control 2.

Further, the peel strength was further improved when water and alcohol were used as solvents. The reason why the peel strength is improved is determined that the contact angle of the adhesive composition using a mixed solvent is lower than the contact angle of the adhesive composition including only deionized water, and thus the coatability of the adhesive composition to the substrate is further improved. However, when the content ratio of deionized water and alcohol is 4:6 by weight, phase separation occurs in the adhesive composition, and thus the adhesive composition cannot be used.

[Reference Example 6] Analysis of Components in Adhesive Composition According to Reaction Temperature Conditions In the preparation of an adhesive composition, the components in the adhesive composition were analyzed according to temperature conditions.

1) Preparation of adhesive composition at 0° C. (low temperature): 79 g of distilled water (DIW) was added to 100 g of a 54 wt % lysine aqueous solution, and the mixture was stirred at 0° C. (T1) for 30 minutes. 70.97 g of citric acid was slowly introduced into the diluted resultant at 0° C. (T2), and stirred for 1.5 hours to prepare an adhesive composition. (solid content: 50 wt %, mixing molar ratio of lysine and citric acid=1:1) An ice bath was used in order to maintain the same temperature during stirring.

2) Preparation of adhesive composition at 25° C. (room temperature): 79 g of distilled water (DIW) was added to 100 g of a 54 wt % lysine aqueous solution, and the mixture was stirred at 25° C. (T1) for 30 minutes. 70.97 g of citric acid was slowly introduced into the diluted resultant at 25° C. (T2), and stirred for 1.5 hours to prepare an adhesive composition. (Solid content: 50 wt %, mixing molar ratio of lysine and citric acid=1:1) A temperature controller was used in order to maintain the same temperature during stirring the adhesive composition (the same below).

3) Preparation of adhesive composition at 60° C.: an adhesive composition was prepared in the same manner as the method in 2), except that T2 was changed to 60° C.

4) Preparation of adhesive composition at 80° C.: an adhesive composition was prepared in the same manner as the method in 2), except that T2 was changed to 80° C.

5) Preparation of adhesive composition at 240° C.: an adhesive composition was prepared in the same manner as the method in 2), except that T2 was changed to 240° C.

As a result of the preparation of an adhesive composition according to the above method, carbide was formed at 240° C., and thus an adhesive composition could not be prepared. Accordingly, analysis of components in the adhesive compositions prepared at 0° C., 25° C., 60° C., and 80° C. was carried out using $^1$H NMR.

NMR analyzers and conditions used in the present disclosure are as follows.

Superconducting Fourier Transform Nuclear Magnetic Resonance Spectroscopy (400 MHz) (Model name: AVANCE II 400, manufacturer: Bruker Biospin (Magnet field strength 9.4 Tesla, Field drift rate: 4 Hz/hr, Observable Frequency: 400 Mhz 1H, Sensitivity: 220: 1(1H), Variable Temp.: −70∼+110° C.), solvent: $D_2O$ $^1$H NMR analysis of the adhesive compositions prepared at 0° C. (sample 1), 25° C. (sample 2), and 80° C. (sample 3) was performed. NMR analysis results are shown in FIG. 1. Referring to FIG. 1, in all of the adhesive compositions prepared at 0° C., 25° C., and 80° C., $^1$H NMR peaks appeared at the same positions, and chemical shift did not occur. Therefore, it can be found that they all have the same composition. That is, it can be found that lysine and citric acid are present in the form of a mixture in all of the adhesive compositions prepared at 0° C., 25° C., and 80° C., and a condensate of lysine and citric acid is not produced, or a very small amount of impurities is included in a condensate even when the condensate is produced.

INDUSTRIAL APPLICABILITY

The adhesive composition for labels according to an embodiment has a new composition including a water-soluble low molecular weight material as a main component, thereby providing both excellent adhesion and controlled water removability. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

The invention claimed is:

1. An adhesive composition for labels, comprising: a salt of lysine and citric acid; and chitosan.

2. The adhesive composition of claim 1, wherein a mixing molar ratio of the lysine and the citric acid is 1:1 to 1:7.

3. The adhesive composition of claim 1, wherein a content of the salt of the lysine and the citric acid is 70 parts by weight or less based on 100 parts by weight of the adhesive composition.

4. The adhesive composition of claim 1, wherein a content of the chitosan is 8 parts by weight or less based on 100 parts by weight of the adhesive composition.

5. The adhesive composition of claim 1, wherein the adhesive composition has a viscosity of 20,000 mPa·s or more.

6. The adhesive composition of claim 1, wherein the adhesive composition has an initial tack of 3.0 mJ or more.

7. The adhesive composition of claim 1, wherein precipitates are not formed in the adhesive composition when the adhesive composition is stored at a temperature of −18° C. to 45° C. for 14 days or more.

8. An adhesive sheet, comprising:
a first substrate; and
an adhesive layer disposed on one surface of the first substrate,
wherein the adhesive layer includes the adhesive composition of claim 1.

9. An article, comprising:
a second substrate; and
the adhesive sheet of claim 8 disposed on the second substrate.

* * * * *